Figure 1:
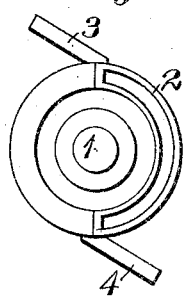

M. WALKER.
ELECTROMAGNETIC APPARATUS.
APPLICATION FILED DEC. 16, 1905.

992,300.

Patented May 16, 1911.

WITNESSES:
Fred H Miller
R. P. Dearborn

INVENTOR
Miles Walker
BY
Wesley G. Carr
ATTORNEY

UNITED STATES PATENT OFFICE.

MILES WALKER, OF MANCHESTER, ENGLAND, ASSIGNOR TO WESTINGHOUSE ELECTRIC & MANUFACTURING COMPANY, A CORPORATION OF PENNSYLVANIA.

ELECTROMAGNETIC APPARATUS.

992,300. Specification of Letters Patent. Patented May 16, 1911.

Application filed December 16, 1905. Serial No. 291,980.

*To all whom it may concern:*

Be it known that I, MILES WALKER, a subject of the King of Great Britain, and a resident of Manchester, in the county of Lancaster, England, have invented a new and useful Improvement in Electromagnetic Apparatus, of which the following is a specification.

My invention relates to electro-magnetic apparatus and it has special reference to such apparatus as is adapted to be energized by alternating electric currents.

The object of my invention is to provide means for so magnetizing the cores of electrical apparatus by alternating currents that a constant polarity may be obtained.

For purposes of regulation, it is sometimes desirable to provide a magnetic field of constant polarity by means of alternating currents. This result is obtained by means of my invention, which may be applied in many cases where direct current magnetization has heretofore been utilized.

Although I have illustrated my invention as utilized solely for regulating the field magnet excitation of an alternating current electric generator, to which it is specially well adapted, it is not restricted thereto and I believe that the production of magnetic fields of constant polarity by means of alternating electric currents is broadly new with me.

Structurally considered, my invention comprises a magnetizable core surrounded by a continuous conductor of one or more turns, which is engaged by a plurality of brushes that are connected to a source of alternating current. The surrounding conductor is so constructed that the paths therethrough, between points which are separated by a distance corresponding to the pitch of the brushes, are of unequal resistance or so that the current flowing through one of said paths produces a magnetization in the core which is opposite to that produced by the current flowing in the other path and of unequal strength. The latter condition may obviously be obtained by constructing one of said paths with more turns or convolutions than the other.

The magnetizable core and its surrounding conductor are rotated by any convenient means in synchronism with the single-phase alternating current which is applied to the brushes. The brushes engage the ring at such points, which may be determined experimentally, that when the electromotive force applied through the brushes is at a maximum value, the resistance between the two paths through the conductor is maximum. In this way, the current flowing through one of the paths at this instant produces a magnetic field in the core which is opposite to and greater than that induced by the current flowing in the other path, so that a field results, the intensity of which is equal to the difference, and since a point under one of the brushes moves to a point under the other brush while the electromotive force impressed upon the conductor changes from maximum in one direction to maximum in the opposite direction, it will be readily seen that the resultant magnetic field produced in the core will be of constant polarity. The principle above indicated may be applied to the regulation of field magetizing currents in alternating current generators, as hereinafter explained.

My invention is illustrated in the accompanying drawings, in which—

Figure 5:
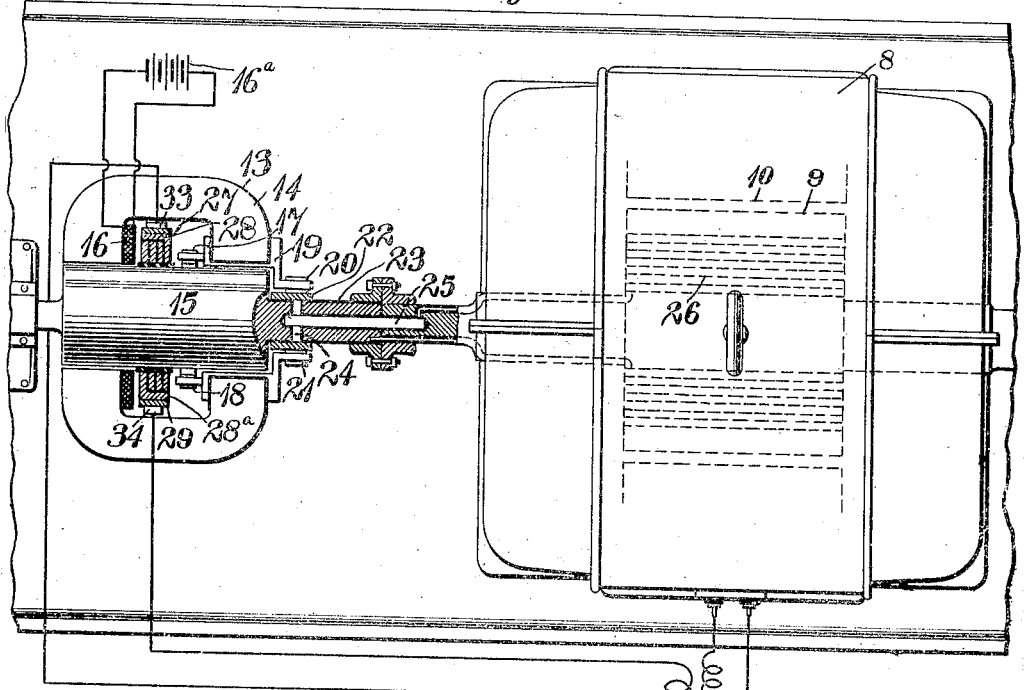
Figure 6:
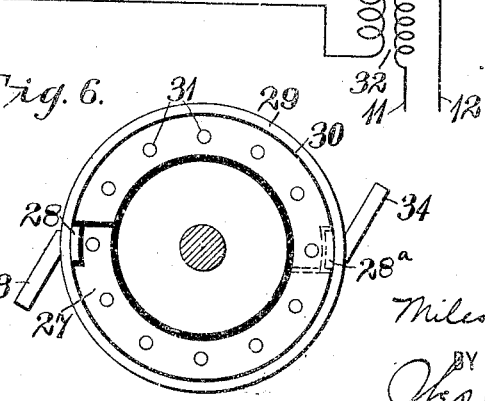

Figures 1, 2, 3 and 4 are diagrammatic views of devices constructed in accordance therewith and disclosing various structural modifications. Fig. 5 is a plan view of an alternating current generator and a homo-polar exciter therefor which is regulated in accordance with my invention, and Fig. 6 is an end elevation of the rotating part of the exciter shown in Fig. 5.

Referring specially to Figs. 1, 2, 3 and 4, a magnetizable core 1 is surrounded by a continuous conductor 2, said conductor being engaged by a pair of brushes 3 and 4 of conducting material. In Fig. 1, conductor 2 consists of a single turn one half of which is of greater resistance than the other half, while in Fig. 2, conductor 2 comprises a single convolution of constant cross-section, two opposite points of which are connected by a conductor 5 which forms a multiple circuit with one-half of the continuous ring and consequently reduces the resistance of this path.

Figure 2:
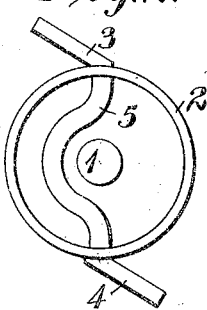
Figure 3:
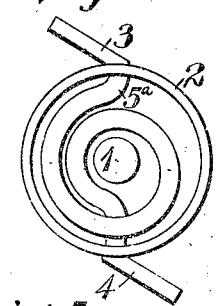
Figure 4:
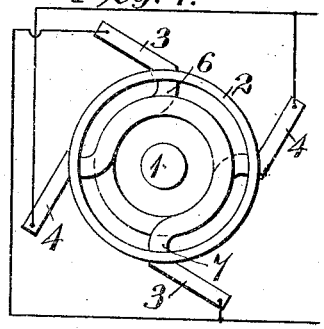

The conductor of Fig. 3 is similar to that of Fig. 2, except that the conductor 5ª consists of one or more convolutions which are wound around the core 1 and take the place of the half turn conductor 5 of Fig. 2.

In Figs. 1, 2 and 3, the brushes 3 and 4 engage their respective conductors at points which are diametrically opposite, in which case it is necessary to maintain the conductor in synchronism with the alternating current applied to the brushes. If, however, it is desirable to reduce the speed at which it is necessary to rotate the conductor, the modification of Fig. 4 may be resorted to, in which four brushes are employed, those that are diametrically opposite being connected together and to one side of a single-phase circuit. In order to properly maintain a magnetic field of constant polarity, a number of convolutions of a conductor 6 are wound about the core 1 and are connected to the conducting ring 2 at points ninety degrees apart on its circumference, while another conductor 7 is wound about the core in the opposite direction and is connected to the remaining quadrant points of the outer conductor. In this way, as the conductor and core are rotated at one-half synchronous speed, the applied electromotive force changes from positive to negative maximum or vice versa while the conductor passes through one quarter of a revolution. The number of turns in the conductor 6 must be different from the number of turns in the conductor 7, which are oppositely wound, or the resistances in the two must be unlike in order that the fields induced in the core may not neutralize each other.

Referring to Figs. 5 and 6, an alternating current generator 8, having a rotary field magnet member 9 and a stationary armature 10, delivers energy to an external circuit 11—12 and receives direct current energy for field excitation from a homo-polar dynamo-electric machine 13. The direct current generator 13 comprises a two-part stationary yoke member 14 between the segments of which a magnetizable core member 15 is rotatably mounted. The stationary member is magnetized by a coil 16 which encircles it and is supplied with direct current energy from any convenient source, such as a battery 16ª. The rotatable core 15 is direct-connected to the field member of the alternating current generator 8, so that its rotation is in synchronism with the alternating current delivered from the armature of the generator.

The stationary yoke 14 consists of two similar parts the extremities of which are diametrically opposite and are slightly removed from the outer cylindrical surface of the core 15.

A magnetic circuit is completed through the two portions of the stationary yoke 14 of the direct current generator 13 and its rotating core member 15, and when this member is rotated, direct current energy is produced. The current thus generated passes from the rotatable member 15, through a pair of stationary engaging brushes 17 and 18, a collar 19, which is mounted upon the yoke 14 and is insulated therefrom, a second pair of stationary brushes 20 and 21 which engage a conducting ring 22 that is insulated from the shaft 23 of the core 15 and conducting rods 24 and 25 which are connected to one terminal of a field magnet winding 26 of the rotatable member 9 of the alternator 8. The opposite terminal of the winding 26 is connected directly to the extremity of the shaft 23, so that a circuit is completed in this way to the core member 15. Direct current generators of this character are specially well adapted for field excitation of high speed alternators, since it is desirable to supply relatively large exciting currents at low voltage so that heavy strap conductors, which may be readily supported in the rotatable members of the alternators may be employed for the field magnet windings.

In order to regulate the field excitation of the alternator so that the electromotive force impressed on the external circuit may be maintained substantially at a constant value under load variations, the magnetism of the rotatable member 15 is varied by means similar to that already described, and illustrated in Fig. 3.

Mounted upon the rotatable core member 15 and insulated therefrom, are a number of convolutions of conductor 27 the terminals of which are electrically connected by two terminal strips 28 and 28ª to an outer surrounding and conducting ring 29 which corresponds to ring 2 of Fig. 3 at two points which are diametrically opposite, the remainder of the ring being separated from the conductor 27 by an insulating ring 30.

In order to make a rigid mechanical structure, the several convolutions of the conductor 27 may be separated by thin disks of hard insulating material and may be clamped together by a plurality of insulated bolts 31. The continuous conducting ring 29 may preferably be constructed of relatively high resistance material, but this is not essential to its operation.

Alternating current energy which is in phase with that delivered to the external circuit 11—12 is supplied from a two-winding transformer 32, the primary of which is connected in series with the external circuit of the generator 8, to two diametrically opposite points on the surface of the ring 29, through a pair of stationary engaging brushes 33 and 34. If the current supplied to these brushes is maximum at the instant when the points of contact between terminal conductors 28 and 28ª and the ring 29 pass under the brushes, the magnetizing effect on the core member 15 will be maximum, but in order to secure automatic regulation for the generator, it is necessary to so adjust the position of the brushes on the ring 29 that with a unit power factor the magnetizing effect upon the core 15 is considerably below its maximum. In this way, as the current lags more and more behind the electromotive force, the magnetizing effect approaches more nearly its maximum. The magnetizing effect upon the core member 15 will obviously be proportional to the load taken from the circuit 11—12, since all the current passes through the primary of the series transformer 32; and since the magnetization of the core 15 determines the amount of current delivered to the field magnet winding of the alternator 8, the field excitation will be varied in proportion to the current delivered from the armature and the electromotive force at the armature terminals may be maintained at a substantially constant value.

I claim as my invention:

1. The combination with a magnetizable core, of a continuous conductor surrounding the core, and comprising two paths of unequal resistance which are responsive to an alternating electric current for producing a magnetic field of constant polarity in the core.

2. The combination with a magnetizable core, and a conductor comprising one or more turns around said core, said conductor comprising two paths of unequal resistance between two diametrically opposite points, of a pair of engaging brushes for said conductor, and means for producing relative movement of said conductor and brushes.

3. The combination with a source of alternating electric currents, a rotatably mounted magnetizable core, a continuous conductor surrounding said core comprising two paths of unequal resistance, and means for rotating the core and conductor, of a pair of stationary brushes which engage said conductor and are connected to said source.

4. The combination with a source of alternating electric currents, a rotatably mounted magnetizable core, and a conductor surrounding said core and comprising two paths of unequal resistance between two diametrically opposite points therein, of means for rotating said core and conductor, and stationary brushes which engage said conductor and are connected to said source.

5. The combination with a source of alternating electric currents, a rotatably mounted magnetizable core, and a continuous conductor surrounding said core and comprising two portions of unequal resistance, of a pair of stationary brushes which engage said conductor and are connected to the source, and means for rotating the core and conductor in synchronism with said source.

6. The combination with an alternating electric current source, a magnetizable core and a surrounding conductor comprising two paths having unequal resistance, and means for rotating said core and conductor in synchronous relation to said source, of a pair of brushes connected to said source and making engagement with said surrounding conductor.

7. The combination with an alternating electric current source, a magnetizable core, a continuous conductor which surrounds the core, and means for rotating said core and conductor in synchronism with said source, of a pair of brushes connected to the source and making engagement with said conductor, said conductor comprising two paths of unequal resistance between points corresponding to the distance between the brushes.

8. The combination with an alternating electric current source, a magnetizable core, one or more turns of continuous conductor surrounding said core, and means for rotating said core and conductor in synchronism with said source, of a pair of brushes connected to said source and making such engagement with said conductor that currents flowing through the two paths in the conductor produce more ampere turns in the one direction than in the other.

9. In a homo-polar direct current generator the combination with a stationary yoke, a rotatable core member and a stationary magnetizing coil which surrounds said core member, of an electric conductor having two current-carrying paths of unequal resistance for producing a magnetic field of constant polarity in said core, and means for supplying alternating current energy to suitable points in said conductor.

10. In a homo-polar direct current generator the combination with a stationary yoke, a rotatable core member and a stationary magnetizing coil which surrounds said core member, of a ring conductor surrounding the core member and insulated therefrom and having two current-carrying paths of unequal resistance for producing a magnetic field of constant polarity in the core member, and means for supplying alternating current energy to suitable points in said conductor.

11. A rotatably mounted electric conductor comprising two current-carrying paths of unequal resistance between predetermined diametrically opposite points.

12. A rotatably mounted magnetizable core and a surrounding conductor therefor having one or more turns and comprising current-carrying paths of unequal resistance between predetermined diametrically opposite points.

13. The combination with a source of alternating current energy, a rotatably mounted magnetizable core, a surrounding conductor therefor and a pair of brushes which engage said conductor and are connected to said source, of means for rotating said core and conductor in synchronism with the electromotive forces delivered from the source.

14. The combination with a source of alternating current energy, a magnetizable core, an encircling ring conductor therefor, and a pair of engaging brushes for said ring which are connected to said source, of a pair of dissimilar windings comprising one or more convolutions, the terminals of which are connected to predetermined points in said ring and encircle the core.

15. The combination with a source of alternating current energy, a magnetizable core, an encircling ring conductor and a pair of engaging brushes therefor that are connected to said source, of a pair of dissimilar opposing windings, comprising one or more covolutions, the terminals thereof being connected to such points on said ring that their distance of separation is equal to the pitch of the engaging brushes.

In testimony whereof, I have hereunto subscribed my name this first day of December, 1905.

MILES WALKER.

Witnesses:
 JAS. STEWART BROADFOOT,
 PERCY WM. HOLT.